United States Patent
Ward

(10) Patent No.: US 6,769,365 B1
(45) Date of Patent: Aug. 3, 2004

(54) SYSTEM AND METHOD FOR ON SITE MAINTENANCE OF RAILCAR WHEELS

(75) Inventor: Mark Ward, Dassel, MN (US)

(73) Assignee: Loram Maintenance of Way, Inc., Hamel, MN (US)

( * ) Notice: Subject to any disclaimer, the term of this patent is extended or adjusted under 35 U.S.C. 154(b) by 0 days.

(21) Appl. No.: 10/365,565

(22) Filed: Feb. 12, 2003

(51) Int. Cl.[7] .............................................. B61B 1/00
(52) U.S. Cl. ...................................... 104/26.1; 104/27
(58) Field of Search ............................... 104/26.1, 307, 104/32.1, 27, 26.2, 9, 51; 105/26.1; 246/14

(56) References Cited

U.S. PATENT DOCUMENTS

| | | | | |
|---|---|---|---|---|
| 1,887,424 A | * | 11/1932 | Perazzoli | 409/178 |
| 3,667,329 A | * | 6/1972 | Dombrowski | 82/104 |
| 3,839,932 A | | 10/1974 | Dombrowski | |
| 3,841,441 A | | 10/1974 | Klinkhammer et al. | |
| 4,276,793 A | * | 7/1981 | Wirtz | 82/1.11 |
| 4,597,143 A | | 7/1986 | Dombrowski | |
| 4,825,737 A | | 5/1989 | Heimann et al. | |
| 4,854,199 A | * | 8/1989 | Norman | 82/112 |
| 4,914,991 A | | 4/1990 | Bathelt et al. | |
| 5,019,115 A | | 5/1991 | Schneider et al. | |
| 5,105,691 A | | 4/1992 | Brinkmann et al. | |
| 5,678,963 A | | 10/1997 | Heimann | |
| 6,021,695 A | | 2/2000 | Kosho et al. | |
| 6,189,427 B1 | | 2/2001 | Kosho et al. | |

FOREIGN PATENT DOCUMENTS

| | | | | |
|---|---|---|---|---|
| FR | 2701277 A1 | * | 8/1994 | E01B/31/17 |
| RU | 2124974 | | 4/1997 | |

OTHER PUBLICATIONS

Brochure: Daedal High Precision Systems and Services, Parker Hannifin Corporation, Irwin, PA, 5 pgs., not dated.
Website Print–out: *Rolling Functional Device, description of products*, 2 pgs., Aug. 2002.
Brochure: AccuMax Linear Roller Guides, Thomson Industries, Ronkonkoma, New York, 1 pgs., 2002.
Brochure: AccuGlide Linear Guides, Thomson Industries, Ronkonkoma, New York, 1 pg., 2002.
Brochure: AccuGlide Miniature Linear Guides, Thomson Industries, Ronkonkoma, New York, 1 pg., 2002.
Brochure: Thomas Linear Motion Products, Thomson Industries, Ronkonkoma, New York, 2 pgs., 1999.

* cited by examiner

*Primary Examiner*—Frantz F. Jules
(74) *Attorney, Agent, or Firm*—Patterson, Thuente, Skaar & Christensen, P.A.

(57) ABSTRACT

The on site maintenance system for metal railcar wheels enables the user to establish a portable, stationary guide rail system about a remotely located railcar and then through use of a traversing guide rail system and lathe assembly grind the many wheels of a railcar with minimal time. The traversing guide rail system rollingly traverses upon side guide rails of the stationary guide rail system and is clamped to existing rails in a desired position. Likewise, the lathe system rollingly traverses upon the cross-wise guide rails of the traversing guide rail system. The lathe system then additionally provides three axes movement for fine-tune positioning of the lathe bit to achieve a desired grind profile of the metal railcar wheel. The wheel being ground is driven by a drive powered by the railcar or may be driven by an external drive and motor connected to the exterior hub of the wheel.

33 Claims, 12 Drawing Sheets

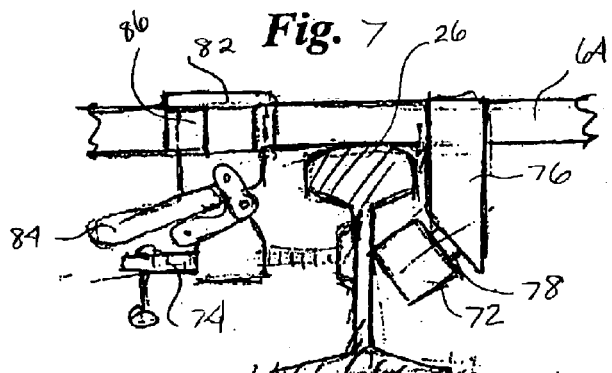
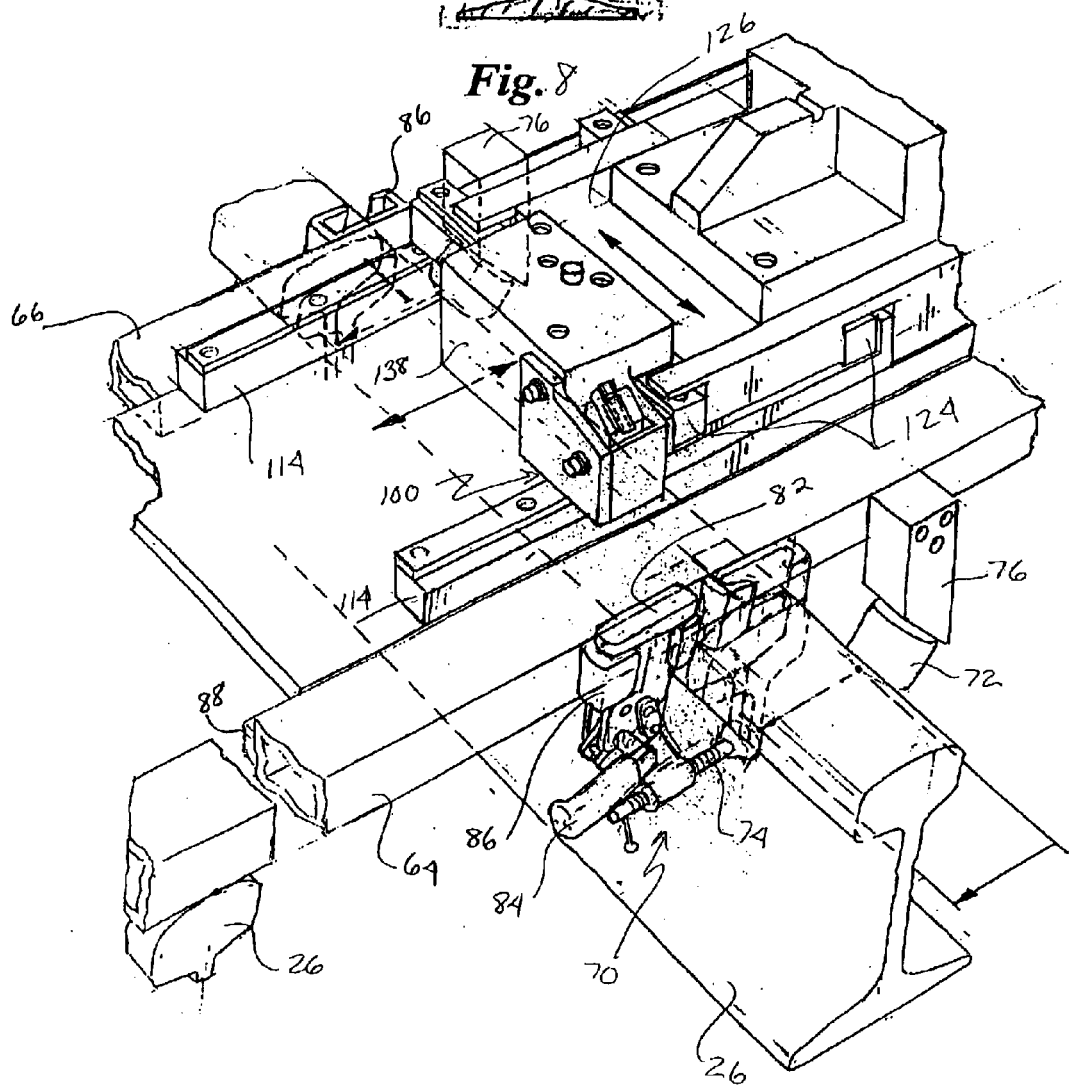

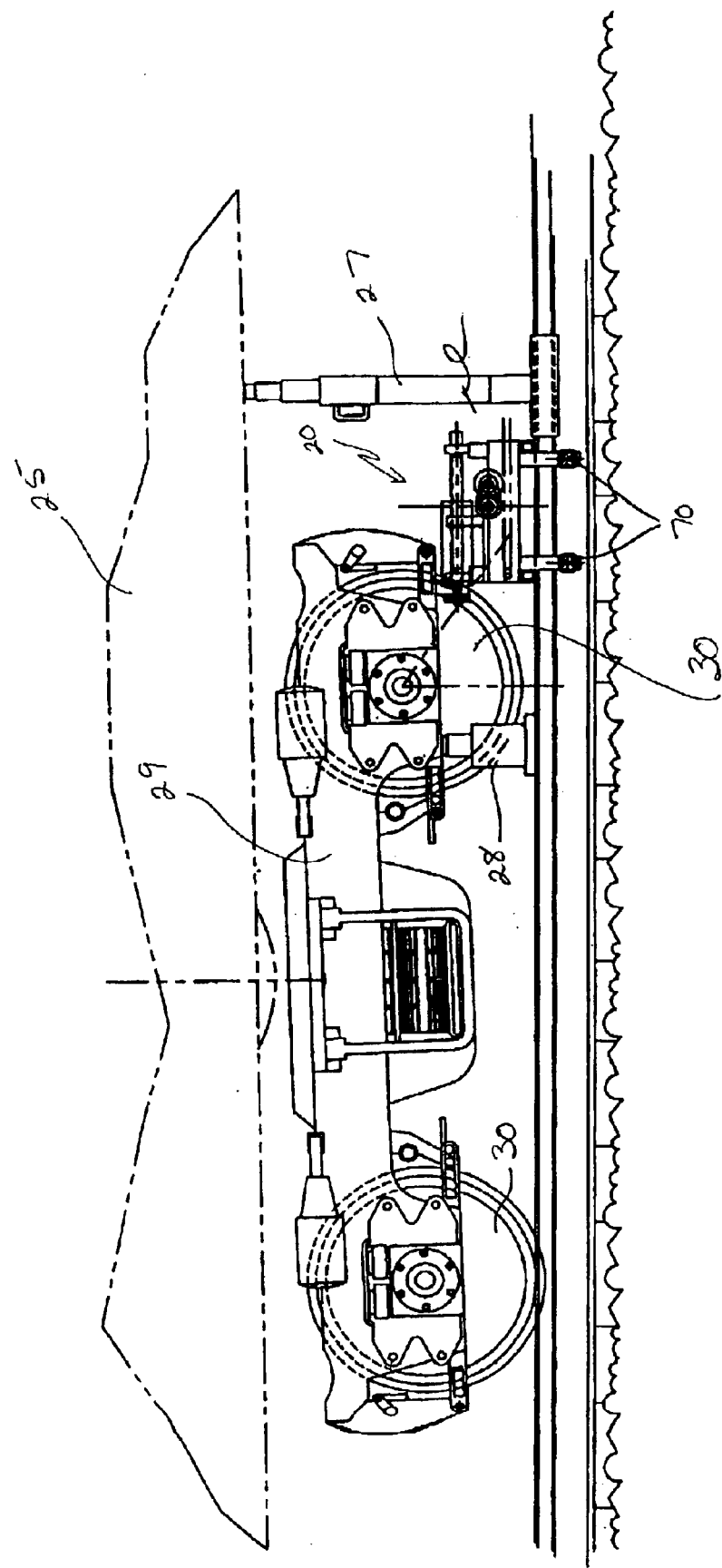

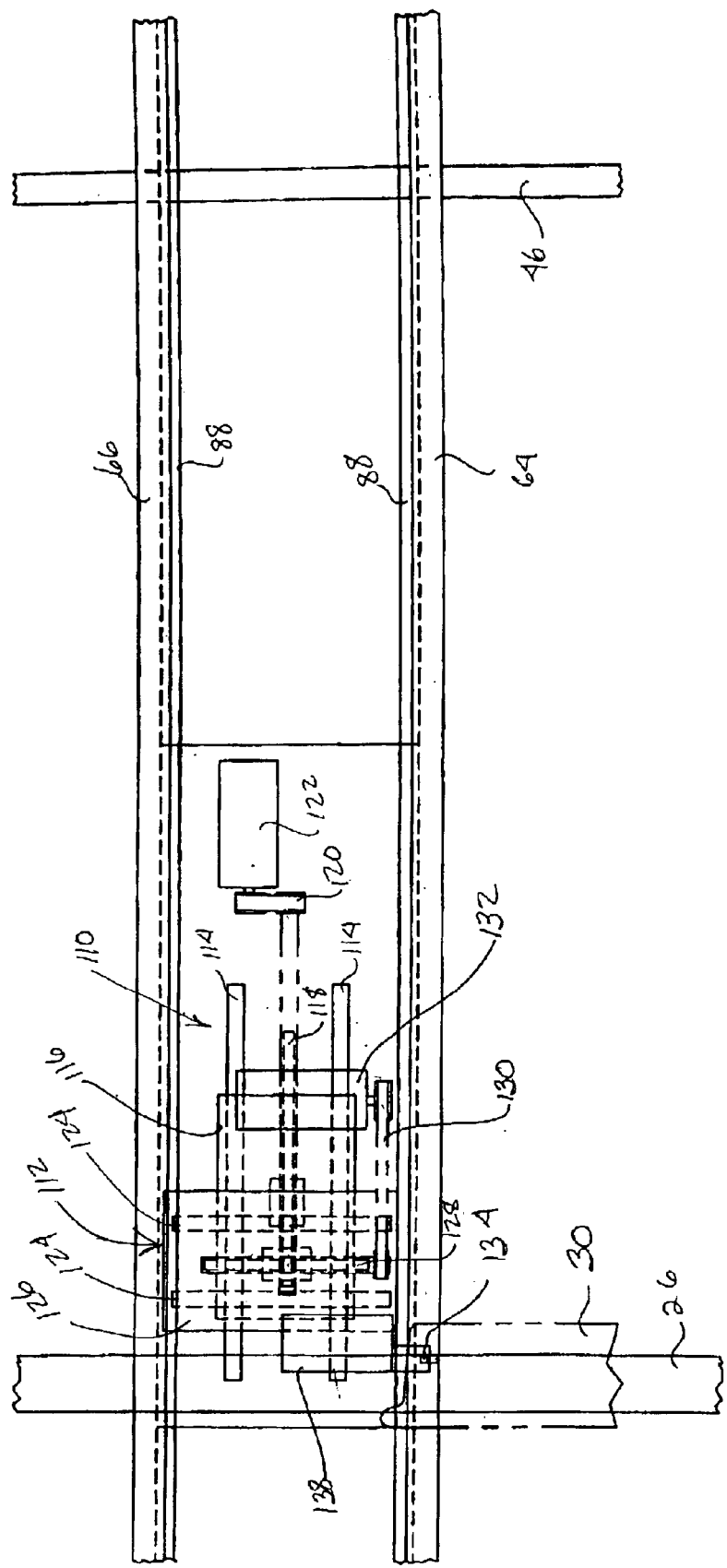

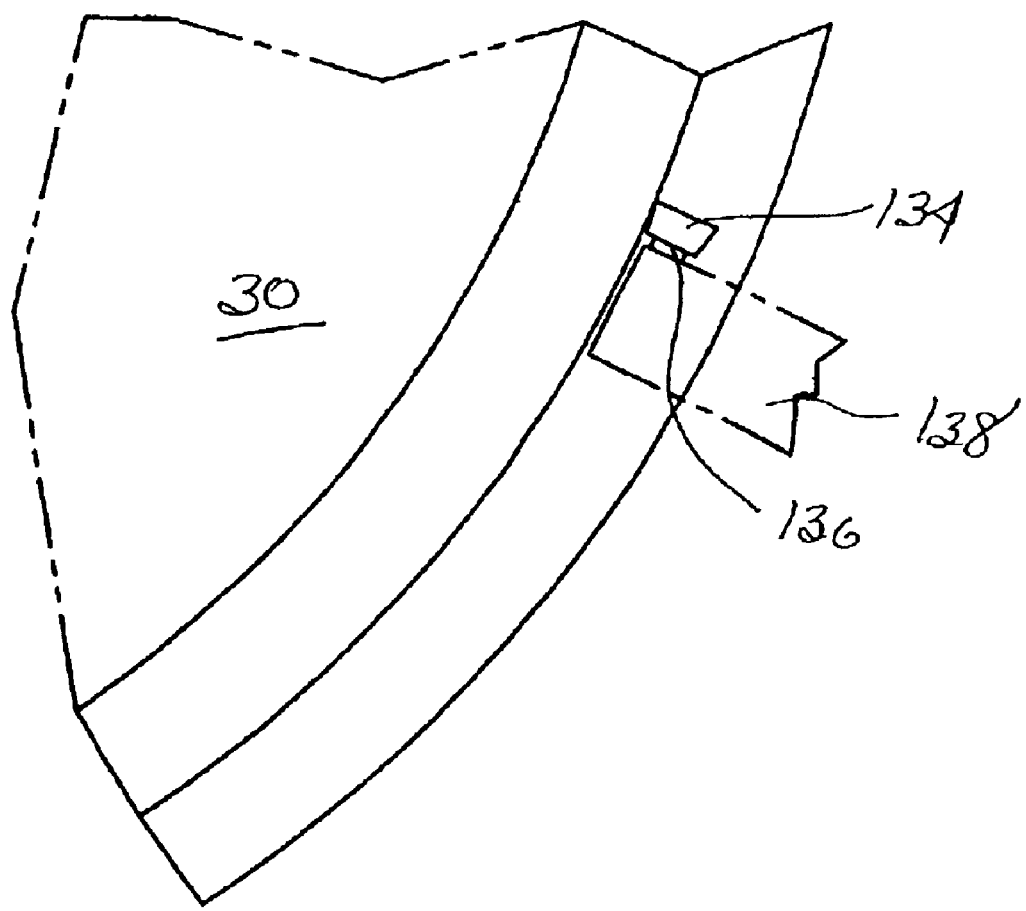

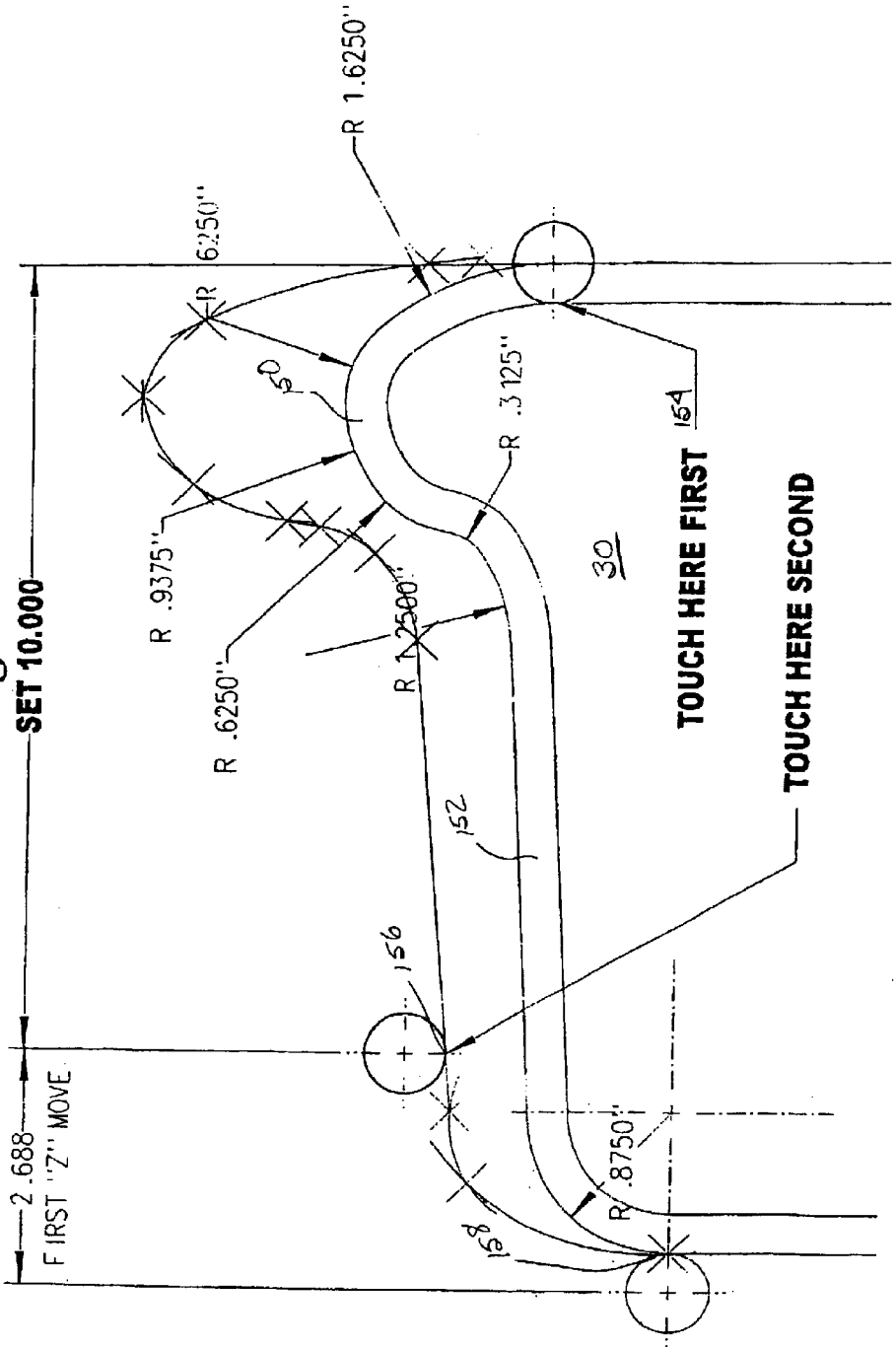

SYSTEM AND METHOD FOR ON SITE MAINTENANCE OF RAILCAR WHEELS

FIELD OF THE INVENTION

The present invention is related to the truing of metal wheels, such as those of a railcar or railroad locomotive and, more particularly, to a system and method that enables the truing of railroad locomotive wheels at virtually any remote location eliminating the need to move the carriages of the locomotive to a pre-existing maintenance station.

BACKGROUND OF THE INVENTION

Railcar wheel maintenance has typically required the removal of the railcar from service and the placement of the railcar in a maintenance facility where the wheels of the rail may be serviced and ground to a desired profile. A common maintenance situation is one in which the railcar is placed over a pit containing a lathe, and having a removable rail section, for the truing of one wheel of the railcar at a time. Upon the desired profile of the wheel being achieved, the railcar is moved so that another wheel may receive maintenance, i.e., the lathe position within the pit is not adjustable. As can be imagined, this is not only a long process but a costly one as well requiring the actual establishment of a maintenance facility and the removal of the railcar from moneymaking service.

An alternative to that above that has been attempted is field maintenance of railcar wheels through removal of a portion of railroad track. In this manner of maintenance, the railcar is allowed to remain at its remote location while the rail is actually cut enabling a whole section of track to removed, i.e., slid out from beneath the railcar. A lathe for truing each of the railcar wheels can then be slid into position proximate the wheel for grinding. While the present manner of maintenance does enable remote location maintenance, it brings with it a number of additional problems to be addressed. The first and most obvious problem is the cutting of the rail, which requires replacement of the rail, the connecting of the replacement rail to the original rail, and the need to ensure that replaced track section meets the standards set by the American Association of Railroads (AAR) for rails. The sliding out of a track section also presents the problem of the railcar wheel sliding against the rail during removal or replacement of the track. This sliding can result in a wheel that has been undesirably flattened (possibly to an unrepairable state) and/or may make the wheel more susceptible to thermal cracking. The removal and replacement of track sections as well as actual wheel maintenance through grinding clearly presents a time-consuming process.

SUMMARY OF THE INVENTION

The railcar wheel maintenance issues described above are in large part addressed and solved by the system and method of on site maintenance of the present invention. Specifically, the present on site maintenance system enables the user to establish a portable, stationary guide rail system about a remotely located railcar and then through use of a traversing guide rail system and lathe assembly, grind the many wheels of a railcar with minimal set-up time, minimal grinding time, minimum take-down time along with the added benefit of eliminating all need to alter the existing track underlying the railcar.

As indicated above, the on site maintenance system of the present invention generally includes a portable, stationary guide rail system, a portable, traversing guide rail system, and a lathe assembly. The portable, stationary guide rail system is preferably supported by a plurality of telescoping jacks. These jacks operate to support a pair of anterior side rails and a pair of interior side rails that form a part of the portable stationary guide rail system, the side rails are off to each side of an existing rail track. Stabilizing forward and rearward cross-members connect the pairs of side rails and rest in part upon the existing rail track.

The portable, traversing guide rail system is supported by casters that roll within channels/tracks presented by the portable, stationary guide rail system. The channels/tracks are found within the side rails of the portable, stationary guide rail system. The portable, traversing guide rail system preferably includes a clamping assembly enabling the assembly to be positioned and clamped to the existing rail track.

The lathe assembly is adjustable along three axes. The adjustments to move assembly to a desired location are preferably made through use of a controller and drives powered by their own power pack. Grinding of the metal railcar wheel is achieved through the bit of the lathe assembly moving through various positions to create a desired profile. The wheel being ground by the lathe is preferably either driven by an on-car motor, e.g., the electric motor of a locomotive, or by connecting an independent drive to the metal, railcar wheel.

A method for on site maintenance of metal railcar wheels of the present invention includes the steps of: (a) erecting the portable, stationary guide rail system about a carriage assembly that is resting atop an existing rail track; (b) supporting the portable, stationary guide rail system substantially exterior to either side of the existing rail track; (c) erecting a portable, traversing guide rail system atop the portable, stationary guide rail system; (d) placing a lathe system atop the portable, traversing guide rail system; (e) moving the portable, traversing guide rail system along the erected portable, stationary guide rail system to a position proximate the carriage assembly; (f) moving the lathe system along the erected, portable traversing guide rail system to a position that is proximate one the metal railcar wheels that is secured to the carriage assembly; and (g) grinding the metal, railcar wheel to a desired profile with the lathe system.

BRIEF DESCRIPTION OF THE DRAWINGS

FIG. 7 is a gage view of one of the clamping assemblies of the portable, traversing guide rail system.

FIG. 8 provides a partial perspective view of the lathe system and of one of the clamping assemblies of the portable, traversing guide rail system.

FIG. 9 is a side elevation view of the on site maintenance system in position for the grinding of a metal railcar wheel.

FIG. 10 is a top plan view of the lathe system in position for the grinding of a metal railcar wheel.

FIG. 11 is a side elevation view of the bit of the lathe assembly in a grinding position against the profile of a metal railcar wheel.

FIG. 13 diagrams a three position grinding profile for a metal railcar wheel.

DETAILED DESCRIPTION OF THE PREFERRED EMBODIMENTS

Figure 1:
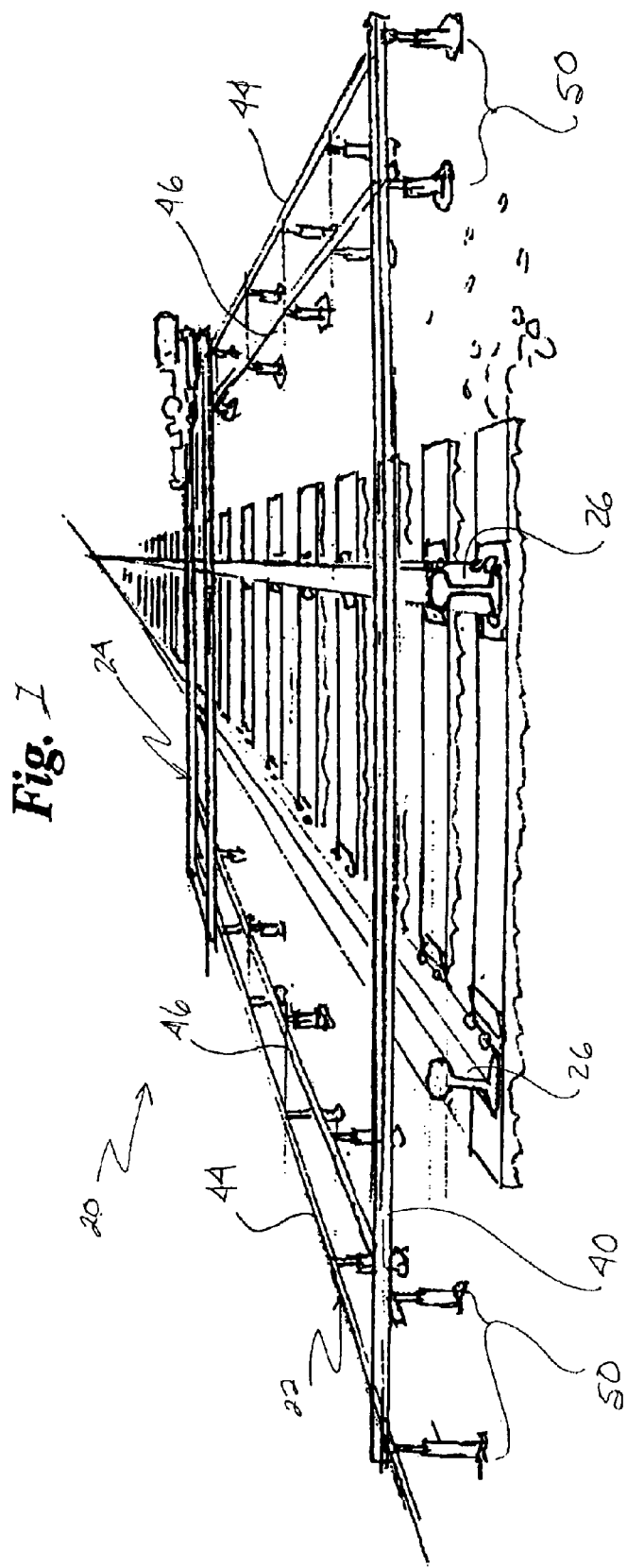
FIG. 1 is a gage view of an on site maintenance system of the present invention.

A system and method for on site maintenance of railroad locomotive wheels of the present invention is described hereinbelow and generally includes a collapsible, portable guide rail system that supports a portable lathe system. The guide rail system and lathe system, combined, enable a lathe to be positioned proximate a wheel of a rail-engaged locomotive, to true a wheel of a rail-engaged locomotive, and to be repositioned for the truing of additional wheels without an altering of the existing railway structure. FIG. 1 depicts the on site maintenance system 20 of the present invention that includes stationary guide rail system 22 and lathe system 24.

I. On Site Maintenance System—Components

Figure 2:
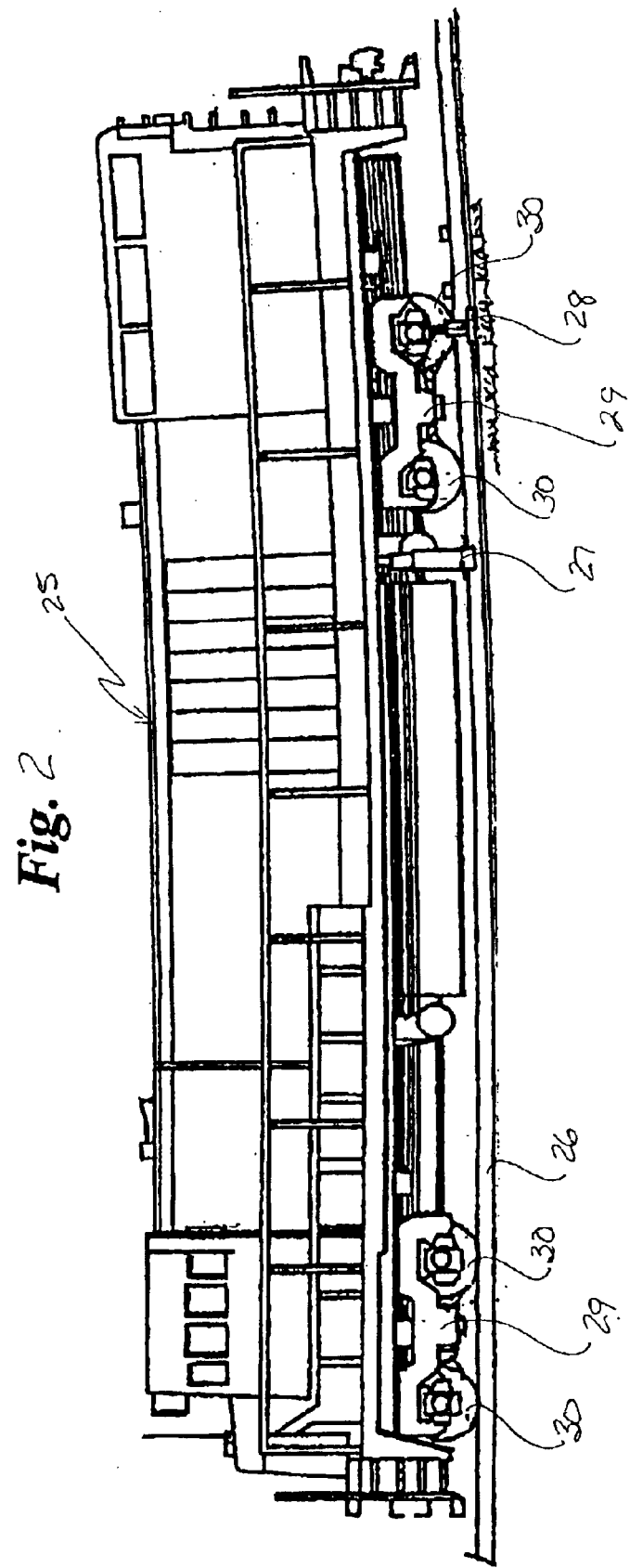
FIG. 2 is a side view of a railroad locomotive, atop an existing railway with which the maintenance system may be used.
Figure 3:
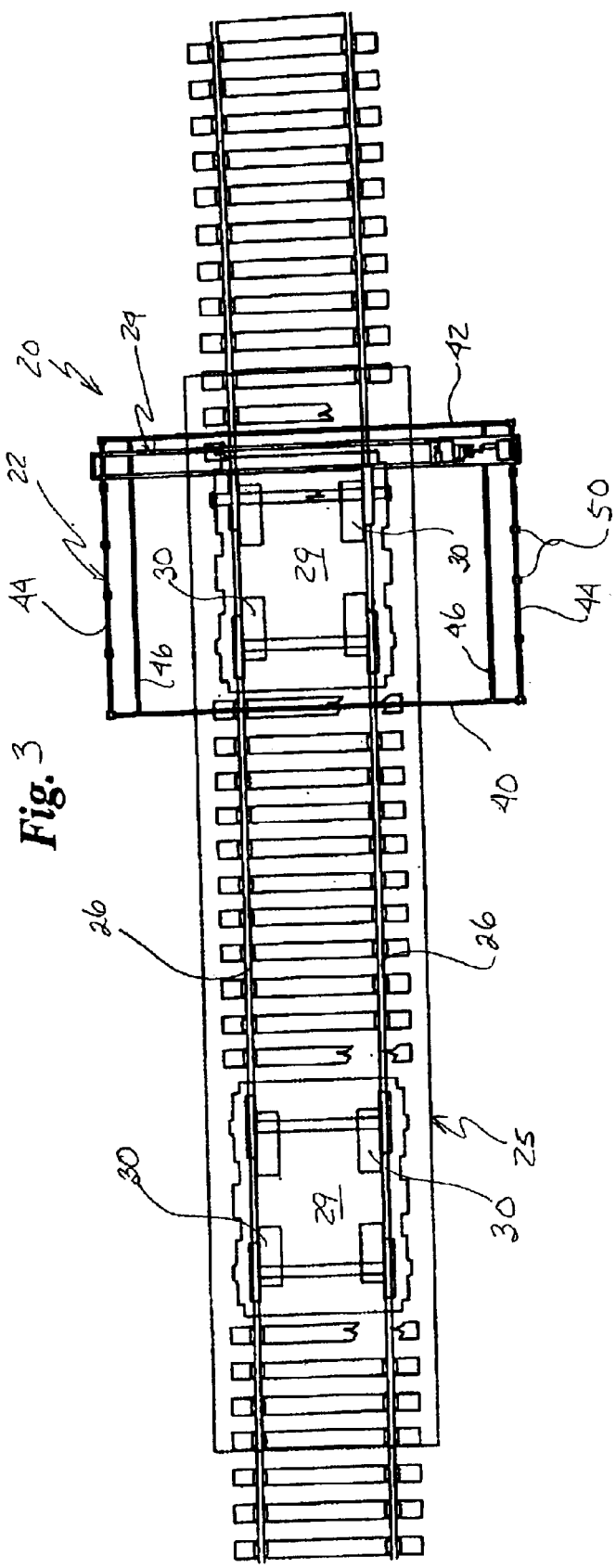
FIG. 3 is a plan view of the on site maintenance system of the present invention as positioned about one of two carriage assemblies of the locomotive of FIG. 2.

Referring to FIG. 1, the on site maintenance system 20 of the present invention may be appreciated. FIG. 1 depicts the stationary guide rail system 22 and lathe system 24 of maintenance system 20 with the railroad locomotive that would normally be present omitted for clarity. FIG. 2 depicts a typical railroad locomotive 25 atop existing rails 26 with which maintenance system 20 may be used. A first jack 27 and second jack 28, whose use will be described below with respect to the operation of the maintenance system 20, are also depicted. As is typical of railroad locomotive construction, locomotive 25 is provided with two carriage assemblies 29 each of which includes four metal wheels 30. FIG. 3 provides a top view of maintenance system 20 depicting its position about one of carriage assemblies 29.

A. Stationary Guide Rail System—Components

Figure 4:
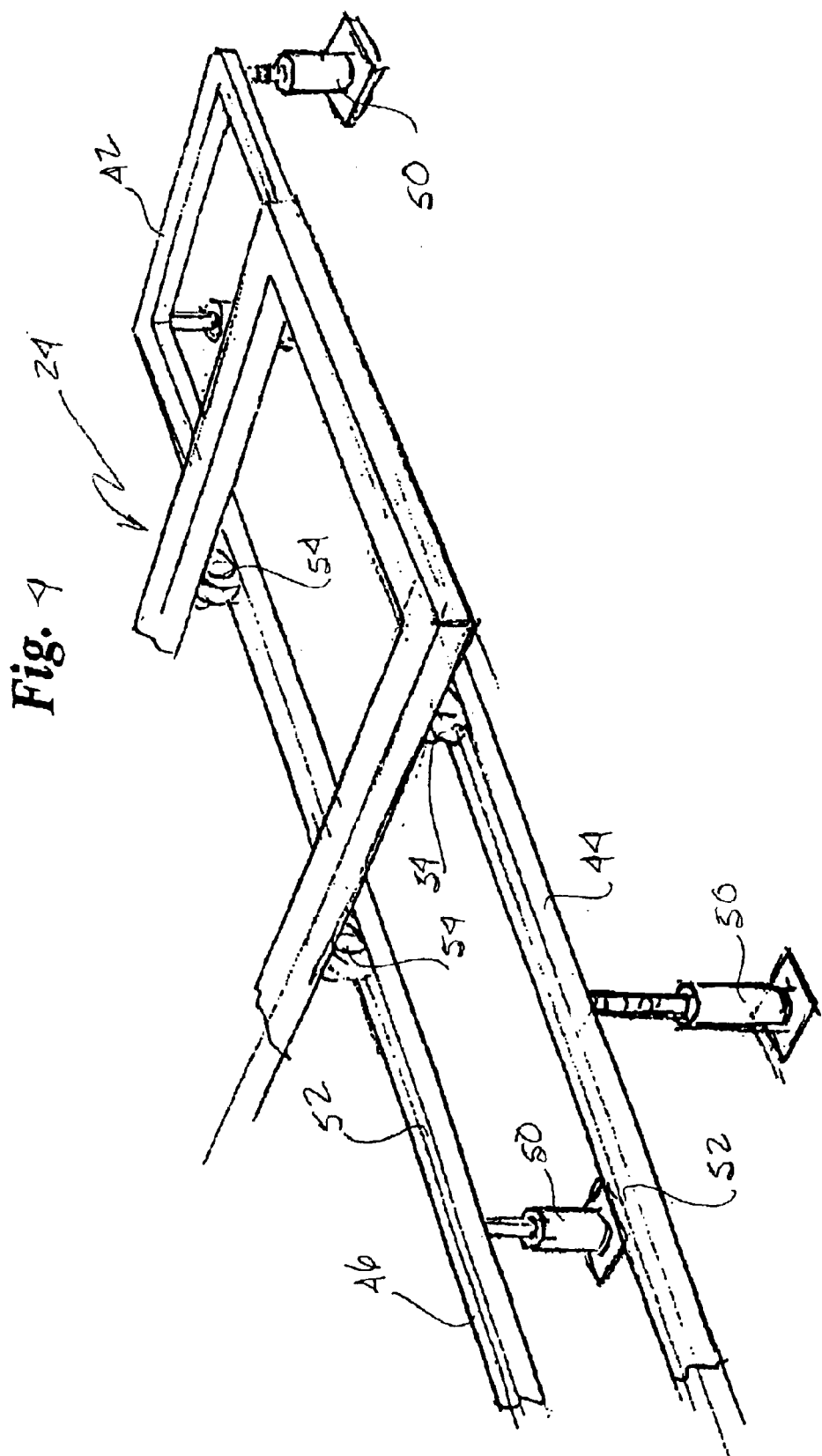
FIG. 4 is a perspective view showing the portable, traversing guide rail system rollingly positioned atop one side of assembled side rails of the portable, stationary guide rail system.
Figure 5:
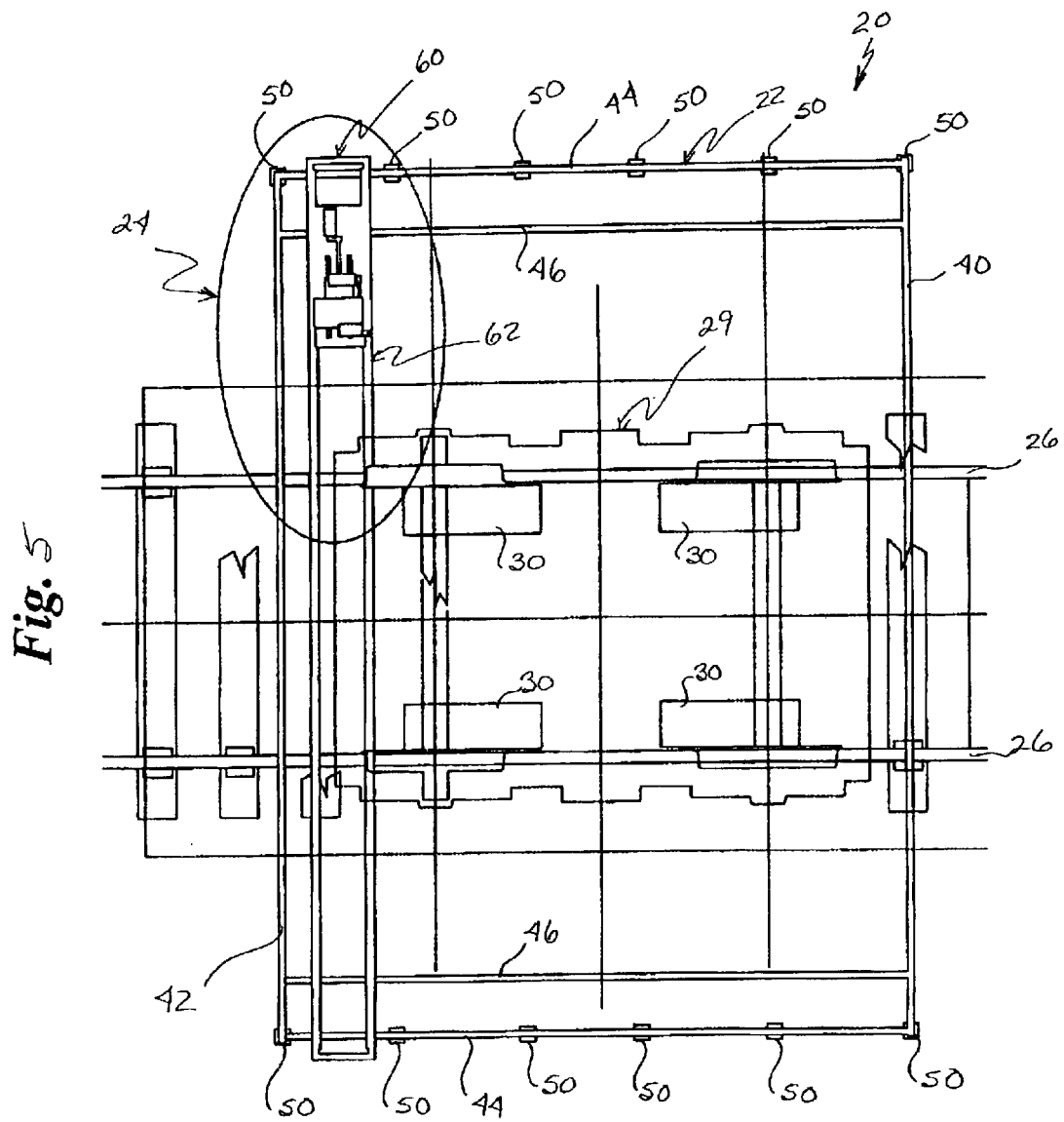
FIG. 5 is a detailed plan view of the on site maintenance system as positioned about a carriage assembly.
Figure 6:
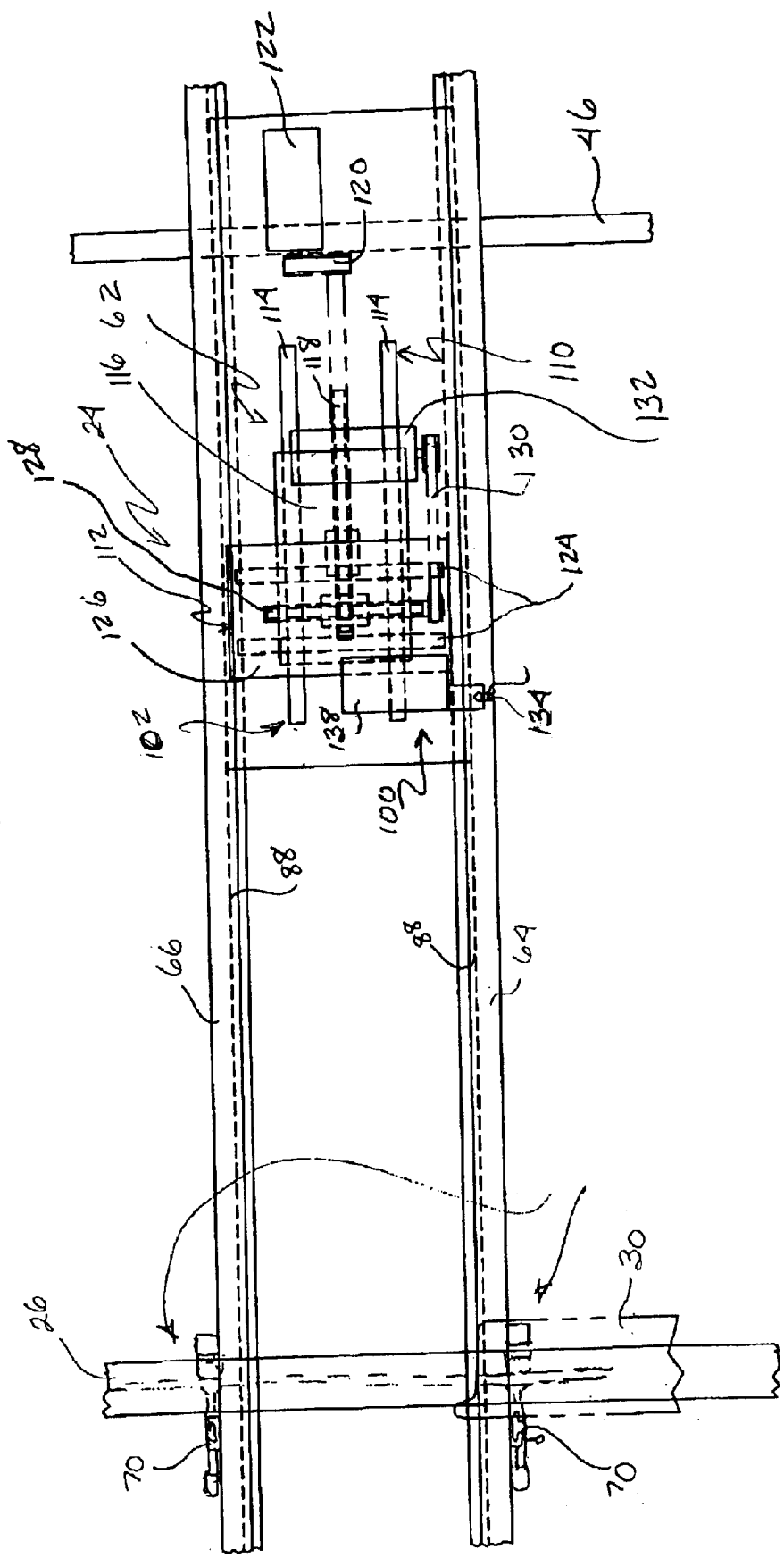
FIG. 6 is a detailed plan view of the lathe system atop the portable, traversing guide rail system, including the clamping assemblies of the traversing guide rail system.

The details of stationary guide rail system 22 may best be appreciated with reference to FIGS. 1 and 3–4. As depicted, stationary guide rail system 22 is designed to be a collapsible, portable system and, as such, comprises an assembly of components that may be easily transported to a desired, remote location including a forward cross-member 40, a rear cross-member 42, a pair of anterior side rails 44, and a pair of interior side rails 46. Side rails 44 and 46 are secured to cross-members 40 and 42 via clamps 74 (see FIG. 7 for example of clamp 74). Side rails 44 and 46 are secured to cross-members 40 and 42 so as to present cross-members 40 and 42 in an orientation that is substantially transverse to existing rails 26 while side rails 44 and 46 are presented in an orientation that is substantially parallel to existing rails 26. Side rails 44 and 46 are each preferably supported along their length by a plurality of telescoping jacks 50 as is each end of cross-members 40 and 42. The telescoping jacks 50 enable the stationary guide rail system 22 to accommodate virtually all types of uneven terrain that may be found to the side of existing rails 26; the use of a plurality of jacks 50 providing additional terrain adjustability as well as distribution of load presented by the lathe system 24. Additional shimming may be provided beneath each of the jacks to present a level orientation. Note that the central portion of each of cross-members 40 and 42 is provided support by existing rails 26 upon which cross-members 40 and 42 rest, providing a stabilizing presence to said stationary guide rail system.

Side rails 44, 46 and cross-members 40, 42 are preferably comprised of a plurality of sections, in the preferred embodiment there are five sections, that are joined together by clamps when on site. The sectional break down of the side rails and cross-members enables easy portability of the system 22.

With particular reference to FIG. 4, it can be seen that each of side rails 44 and 46 is preferably provided with a channel 52. Channels 52 provide the lanes through which support casters 54 of lathe system 24 may traverse to move lathe system 24 in a forward and rearward motion, i.e., a first axis of movement.

B. Lathe System—Components

Referring to FIGS. 4–12, the details of lathe system 24 may be appreciated. As shown per FIG. 5, lathe system 24 is, itself, comprised of a traversing guide rail system 60 and a lathe assembly 62. Once assembled, the traversing guide rail system 60, along with stationary guide rail system 22, enables the lathe assembly 62 to be positioned at each wheel 30 of carriage assembly 29 without a take down and reassembly of guide rail systems 60 and 22.

i. Traversing Guide Rail System—Components

Traversing guide rail system 60 includes a forward cross-member 64 and a rearward cross-member 66 connected by a pair of side rails 68. See, in particular, FIGS. 5 and 10. Each side of traversing guide rail system 60 is supported by four support casters 54, two of which ride within the channels 52 of anterior side rails 44 and two of which ride with the channels 52 of interior side rails 46. See, in particular, FIG. 4. Further, each of forward cross-member 64 and rearward cross-member 66 is provided with two clamping assemblies 70 to enable clamping of traversing guide rail system 60 to rails 26. See, in particular, FIGS. 7 and 8.

Each clamping assembly 70 includes a registration roller 72 and a clamp 74. The registration roller 72 is supported by a downward extending arm 76, the upper portion of which is fixedly secured to cross-member 64 or 66, see FIG. 8. The lower portion of arm 76 is presented at an angle substantially consistent with the underside of rail 26 (see FIG. 7), and supports, via an angled hub 78, registration roller 72. The screw-type clamp 74 is secured to a support arm 82 about which it is allowed to angularly adjust. The support arm 82 is preferably provided with a handle 84 enabling easy placement and removal of clamp 74 from a suspension bracket 86. The suspension bracket 86 is fixedly secured to each of cross-members 64 and 66. Once in a desired position, traversing guide rail system 60 can be clamped into position against rails 26 by placing registration roller 72 against one side of rail 26 and tightening clamp 74 against the opposite side of rail 26.

The registration roller 72 and clamp 74 of clamping assembly 70 ensures that any forward and backward movement of traversing guide rail system 60 is consistent with the line established by rail 26 rather than by the line established by stationary guide rail system 22. This, in turn, ensures that the lathe assembly 62 will be in line with the wheel 30 that must ride upon the rail 26 resulting in a wheel that is trued to the rail 26.

Forward cross-member 64 and rearward cross-member 66 are each provided with an inner support rail 88 for support of lathe assembly 62. Inner support rails 88 enable the crosswise, or side-to-side movement of the lathe assembly 62 and, thereby, enable the lathe assembly 62 to reach both rearward or forward wheels 30 of the carriage assembly 29 while allowing traversing guide rail system 60 to remain clamped in position against rails 26.

ii. Lathe Assembly—Components

The lathe assembly 62, see FIGS. 5–6, 9–10, and 12, generally comprises a cutting tool 100 that is connected to and positioned by an X-Y table 102, and a platform 104 upon which X-Y table 102 is mounted. The platform 104 rests atop inner support rails 88 and is slidable thereon. The lathe assembly 62 is preferably provided with a plurality of rollers, e.g., in the preferred embodiment the lathe assembly 62 is provided with five rollers on each side, that enable it to be manually pushed from side to side, i.e., rail to rail.

The X-Y table 102 is comprised of a first guide rail system 110 and a second guide rail system 112. The first guide rail system 110 includes a pair of first-directional guide rails 114, a first carriage 116, and a first ballscrew 118 that is coupled via a belt 120 to a first drive motor 122. The pair of first-directional guide rails 114 are secured to platform 104. The first carriage 116 rides upon the first directional guide rails 114 via rail bearings (not shown) and is positioned thereon through the turning of first ballscrew 118 by first drive motor 122.

The second guide rail system 112 includes a pair of second-directional guide rails 124 that are mounted atop first carriage 116 in a manner substantially perpendicular to first-directional guide rails 114. A second carriage 126 rides atop second-directional guide rails 124. The position of second carriage 126, relative guide rails 124, is adjusted via the turning of a second ballscrew 128 by a second drive motor 132, second ballscrew 128 and second drive motor 132 are connected by a belt 130.

Figure 12:
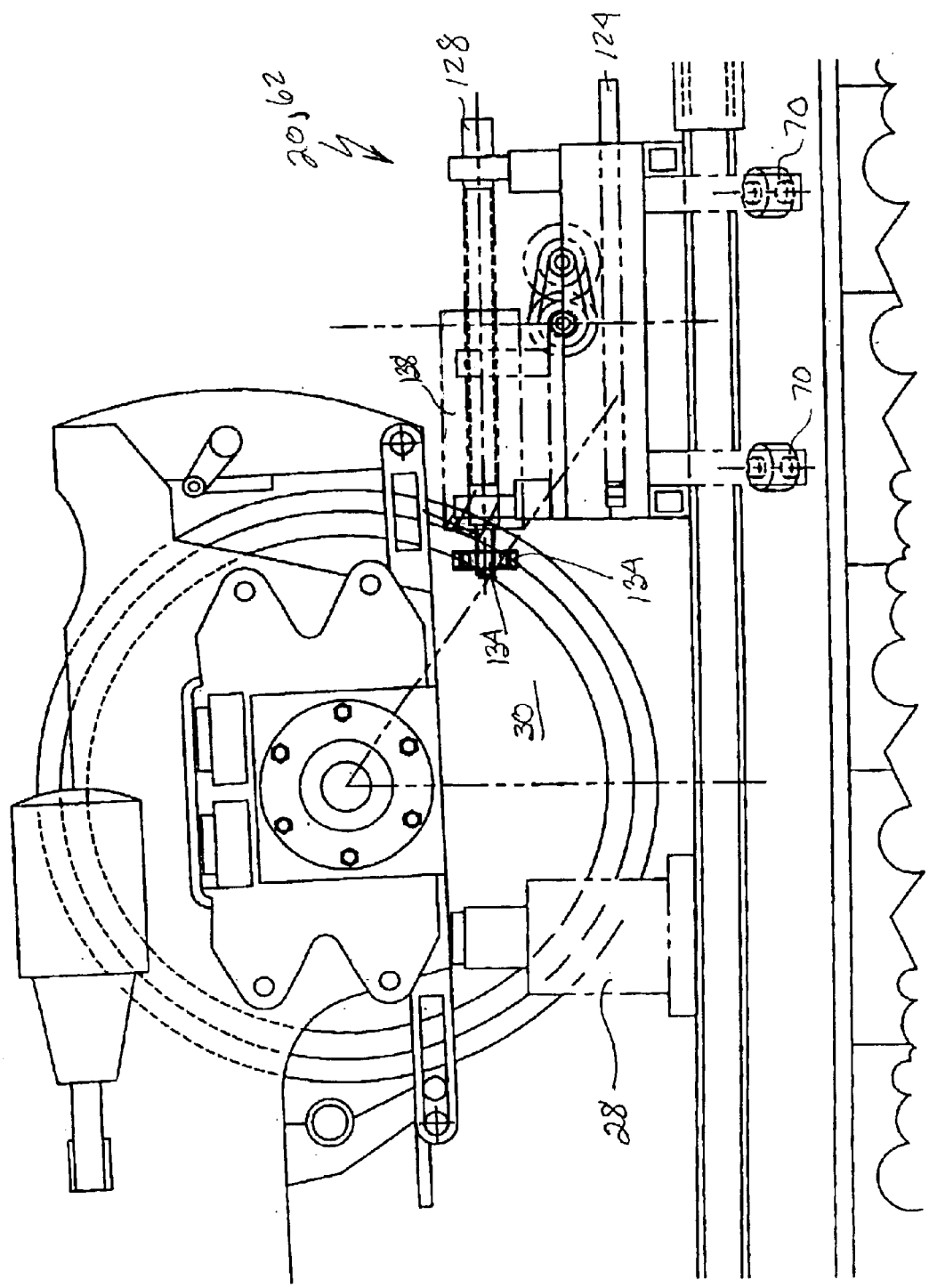
FIG. 12 is a side elevation view of the lathe assembly in a grinding position against the profile of a metal railcar wheel.

The cutting tool 100, see FIGS. 9 and 12, preferably includes a 100-bit head 134 mounted atop a support rod 136. The support rod 136 is contained by a support block 138, which is mounted at a desired angle, relative the X-Y plane established by X-Y table 102, to second carriage 126. The wheel is preferably presented at a position that is at least two inches off the rail in order for the desired angle to be achieved. The bit head 134 has a both a left and right angle head to enable grinding on either side of the wheel. In the preferred embodiment, the bit head 134 is a KENNAMETAL®/Traol-204D/TraoR-204D.

A programmable controller (not shown) is used to control the position of the X-Y table. In the preferred embodiment, the controller is a FAGOR 8055 CNC controller wherein the pre-programmed software has been customized for the present system.

The lathe assembly 62 is provided with its own hydraulic power pack for driving the motors that position the X-Y table. In the preferred embodiment, a DC drive, with DC drive controller, is utilized.

II. On Site Maintenance System—Operation

In operation, the on site maintenance system 20 of the present invention is brought to a remote location of a railroad locomotive 25 in need of wheel maintenance. The locomotive is jacked up on one end, e.g., the rear allowing the locomotive 25 to rest on its front, see FIG. 9, with jack 27. The end of the locomotive is raised sufficiently high to enable lathe assembly 62 to pass underneath from rail 26a to rail 26b to reach the corresponding wheels without the repositioning of jack 27. With jack 27 established, and locomotive 25 resting at an angle, a second jack 28 is used to raise the wheels 30 to receive maintenance off of the rails 26.

The stationary guide rail system 22 is then established about the locomotive by placement of forward and rearward cross-members 40, 42 and by placement of anterior and interior side rails 44, 46. Telescoping jacks 50 are then placed to support the anterior and interior side rails 44, 46 and are adjusted to establish stationary guide rail system 22 as a level support structure. Note that the stationary guide rail system 22 has been designed in contemplation of the minimal space that may be provided to either side of a rail track. Specifically, stationary guide rail system 22 has been designed knowing that there may be only four feet between the edge of one track's ties to the edge of a parallel track's ties, both anterior and interior side rails 44, 46 may be positioned within this four feet of space yet still provide sufficient distance from the locomotive 25 to allow lathe assembly 62 to pass alongside locomotive 25 without interference.

With the stationary guide rail system 22 established and level the traversing guide rail system 60 of the lathe system 24 may be erected atop the stationary guide rail system 22. The traversing guide rail system 60 is erected by joining forward and rearward cross-members 64, 66 with side rails 68, and by placing support casters 54 within the channels 52 of anterior and interior side rails 44, 46 of stationary guide rail system 22.

Next, the lathe assembly 62 of the lathe system 24 is positioned atop and supported by the inner support rails 88 within side rails 68 of traversing guide rail system 60. In the preferred embodiment, a seven ton crane maintained on a trailer that can be hauled to a site, is used to lift the lathe assembly 62 atop the support rails. Alternatively, a service truck may be utilized to lift and lower the lathe assembly 62. Finally, the lathe assembly 62 is moved into position proximate one of wheels 30 that is to receive maintenance. The wheel to receive maintenance is then preferably rotated/driven by the electric motors of the locomotive 25 in offline mode. The bit 134 of cutting tool 100 is then moved into the flange 150 of the wheel 30 where grinding begins. The grinding of wheel 30 is preferably complete in three to five sections rather than in one turn. See FIG. 13, wherein three touch points 154, 156, and 158 complete the grinding of wheel 30 over the flange 150 and tread of the wheel 30.

With the maintenance of one wheel 30 complete, e.g., the rear wheel, the lathe assembly 62 is moved to grind the opposite rear wheel. And, in doing so, the stationary guide rail system 22 remains stationary in its erected position as does traversing guide rail system 60. Once the grinding of the rear wheels are complete, the lathe assembly 62 is moved to one side of traversing guide rail system 60 leaving only forward and rearward cross-members 64 and 66 to pass under the suspended wheels. The second jack 28 is removed from the wheel 30, while first jack 27 remains in position, providing clearance for the passage of cross-members 64 and 66 under rear wheels 30. The front wheels 30 of the same carriage assembly 29 may now be ground in a similar fashion.

With all wheels 30 of one carriage assembly 29 of locomotive 25 complete, the lathe assembly 62 is once again moved to one side of traversing guide rail system 60 (forward and rearward cross-members 64, 66 extend across rails 26 between the two carriage assemblies 29), jacks 27 and 28 are removed and are placed at the opposite end of locomotive 25 so that wheels of the second carriage assembly 29 may be ground for maintenance. Again, stationary guide rail system 22 remains in position while traversing guide rail system 60 is moved proximate wheels 30 to be ground and clamped into position with clamping assemblies 70. Lathe assembly 62 is then used to create the desired profile on the remaining wheels in the manner described above.

The above has been described with reference to the grinding of wheels on a locomotive wherein the wheels may be driven for grinding by the electric motors of the locomotive, however, it should be noted that the wheels of other railcars may be similarly maintained with on site maintenance system by utilizing an independent, portable drive having its own power unit. Specifically, the end cap of the wheel may be taken off and the drive bolted on to the axle of the wheel with splines. It has been found that the drive needs to deliver at least 900 ftl/lbs of torque to run the ring gear of the wheel against the pinion to make the motor start turning.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed:

1. A system for on site maintenance of metal railcar wheels, wherein said metal, railcar wheels are atop an existing rail track and are secured to a carriage assembly, the system comprising:
   a portable, stationary guide rail system established about said carriage assembly and supported exteriorly to said existing rail track;
   a portable, traversing guide rail system, wherein said portable, traversing guide rail system rests atop and traverses upon said portable, stationary guide rail system; and
   a lathe assembly, wherein said lathe assembly rests atop and traverses upon said, portable, traveling guide rail system, and wherein said lathe assembly includes a bit to grind said metal, railcar wheels.

2. The system of claim 1, wherein said portable, stationary guide rail system is supported by a plurality of jacks.

3. The system of claim 1, wherein said portable, stationary guide rail system includes a pair of anterior side rails and a pair of exterior side rail.

4. The system of claim 1, wherein said portable stationary guide rail system includes a forward cross-member and a rearward cross-member, and wherein said forward and rearward cross-members rest upon said existing rail tack.

5. The system of claim 1, wherein said portable, traversing guide rail system includes a plurality of supporting casters.

6. The system of claim 5, wherein said plurality of supporting casters ride within a channel provided by said portable, stationary guide rail system.

7. The system of claim 1, wherein said portable, traversing guide rail system includes a clamping assembly.

8. The system of claim 7, wherein said clamping assembly is clamped to said existing rail track.

9. The system of claim 1, wherein said lathe assembly includes a portable, power pack.

10. The system of claim 1, wherein said lathe assembly includes a controller.

11. The system of claim 10, wherein said controller controls the position of the lathe assembly to achieve a desired profile upon said metal railcar wheels.

12. The system of claim 11, wherein said lathe assembly is adjustable on three axes.

13. The system of claim 1, wherein said metal railcar wheel is driven by a motor and drive system local to the railcar or by a motor and drive system external to the railcar.

14. A system for on site maintenance of metal railcar wheels, wherein said metal railcar wheels are atop an existing rail track and are secured to a carriage assembly, the system comprising:
   lathe means for grinding said metal, railcar wheels;
   portable traversing means for enabling said lathe means to traverse among said metal, railcar wheels, wherein said portable traversing means includes rolling means for rolling upon said portable support means; and
   portable support means for enabling said portable traversing means to traverse about said carriage assembly, wherein said portable support means is established substantially, exteriorly to either side of said existing rail track.

15. The system of claim 14, wherein said lathe means is adjustable along three axes.

16. The system of claim 14, wherein said lathe means includes control means for controlling the position of said lathe means to achieve a desired profile on said metal, railcar wheels.

17. The system of claim 14, wherein said lathe means includes power means for powering a movement of said lathe means.

18. The system of claim 14, wherein said portable traverse means includes clamping means for clamping said portable traversing means to said existing rail track.

19. The system of claim 14, wherein said portable support means includes cross-stabilizing means for resting upon said existing rail track and for stabilizing said portable support means.

20. The system of claim 14, wherein said portable support means includes track means for providing a track in which said portable traversing means can traverse.

21. The system of claim 14, wherein said portable support means includes a plurality of leveling means for enabling said portable support means to present a level surface.

22. The system of claim 14, further comprising drive means for driving the rotation of said metal railcar wheel wherein said drive means is local to the railcar or external to the railcar.

23. A method for on site maintenance of metal railcar wheels, wherein said metal railcar wheels are atop an existing rail track and are secured to a carriage assembly, the method comprising the steps of:
   erecting a portable, stationary guide rail system about said carriage assembly;
   supporting said portable, stationary guide rail substantially exteriorly to either side of said existing rail track;
   erecting a portable, traveling guide rail system atop said portable stationary guide rail system;
   placing a lathe system atop said portable, traversing guide rail system;
   moving said portable, traversing guide rail along the erected portable, stationary guide rail system to a position proximate said carriage assembly;
   moving said lathe system along the erected, portable traversing guide rail system to a position proximate one of said metal railcar wheels; and
   grinding said one of said metal, railcar wheels to a desired profile with said lathe system.

24. The method of claim 23, wherein said step of supporting is performed utilizing a plurality of telescoping jacks.

25. The method of claim 23, wherein step of erecting said portable, stationary guide rail system includes erecting a pair of anterior side rails and a pair of exterior side rails.

26. The method of claim 23, wherein said step of erecting said portable, stationary guide rail system includes erecting a forward and a rearward cross-member, wherein said forward and rearward cross-members rest upon said existing rail track.

27. The method of claim 23, wherein said step of moving said portable, traversing guide rail system comprises rolling said portable, traversing guide rail system.

28. The method of claim 27, wherein said rolling occurs within a track of the erected portable, stationary guide rail system.

29. The method of claim 23, further comprising the step of clamping the erected, portable traversing guide rail system to said existing rail track.

30. The method of claim 23, further comprising the step of independently powering said lathe system.

31. The method of claim 23, further comprising the step of controlling the position of said lathe system to achieve said desired profile.

32. The method of claim 31, wherein the step of controlling comprises controlling the position of said lathe system along three axes of motion.

33. The method of claim 23, further comprising the step of driving said metal railcar wheel with a motor and drive system that is local to the railcar or external to the railcar.

* * * * *

UNITED STATES PATENT AND TRADEMARK OFFICE
CERTIFICATE OF CORRECTION

PATENT NO. : 6,769,365, B1
DATED : August 3, 2004
INVENTOR(S) : Ward

It is certified that error appears in the above-identified patent and that said Letters Patent is hereby corrected as shown below:

Column 1,
Line 33, before "removed," insert -- be --.

Column 5,
Line 47, after "has" delete "a".

Column 6,
Line 3, after "25" insert -- is --.

Column 7,
Line 48, delete "rail" and insert -- rails --.
Line 52, delete "tack" and insert -- track --.

Column 8,
Line 4, delete "traveling" and insert -- traversing --.
Line 29, delete "traverse" and insert -- traversing --.

Signed and Sealed this

Twenty-eighth Day of June, 2005

JON W. DUDAS
*Director of the United States Patent and Trademark Office*